United States Patent [19]

Keller et al.

[11] E Re. 30,702

[45] Reissued Aug. 11, 1981

[54] DOFFER WITH PNEUMATIC CONTROL SYSTEM

[76] Inventors: Alex J. Keller, 75 Ridgeport Rd., River Hills Plantation, Clover, S.C. 29710; Keith S. Dellinger, 1801 Hollandale; James L. Ray, 2235 Shaw Ave., both of Gastonia, N.C. 28052; Thomas A. Cherry, Rte. 5, Box 188, Mooresville, N.C. 28115; Erhard A. Fechner, 3000 Whitson Rd., Gastonia, N.C. 28052

[21] Appl. No.: 88,780

[22] Filed: Oct. 29, 1979

Related U.S. Patent Documents

Reissue of:

[64] Patent No.: 4,081,949
Issued: Apr. 4, 1978
Appl. No.: 763,662
Filed: Jan. 28, 1977

[51] Int. Cl.[3] ..... D01H 9/10

[52] U.S. Cl. ..... 57/268; 57/271

[58] Field of Search ..... 57/266, 264, 268, 271, 57/272, 274, 275, 276; 116/DIG. 7, 266

[56] References Cited

U.S. PATENT DOCUMENTS

| | | | |
|---|---|---|---|
| 3,394,539 | 7/1968 | Morikawa et al. | 57/269 |
| 3,413,794 | 12/1968 | Bell et al. | 57/268 X |
| 3,442,072 | 5/1969 | Gillono et al. | 57/275 X |
| 3,472,374 | 10/1969 | Ness et al. | 116/266 X |
| 3,830,049 | 8/1974 | Kieronski et al. | 57/272 |
| 4,102,115 | 7/1978 | Hemala et al. | 57/268 X |

*Primary Examiner*—Donald Watkins
*Attorney, Agent, or Firm*—Richards, Shefte & Pinckney

[57] ABSTRACT

Apparatus movable along a spinning frame to doff full bobbins from the spindles thereof and to don empty bobbins onto such spindles. Low pressure pneumatic sensors are provided for emitting a stream of low pressure air into the path of movement of selected elements of the apparatus and generating a pneumatic signal each time a stream of low pressure air is interrupted by the movement of such elements, and a low pressure pneumatic control system receives the pneumatic signals and operates the selected elements of the apparatus in a predetermined sequence.

13 Claims, 12 Drawing Figures

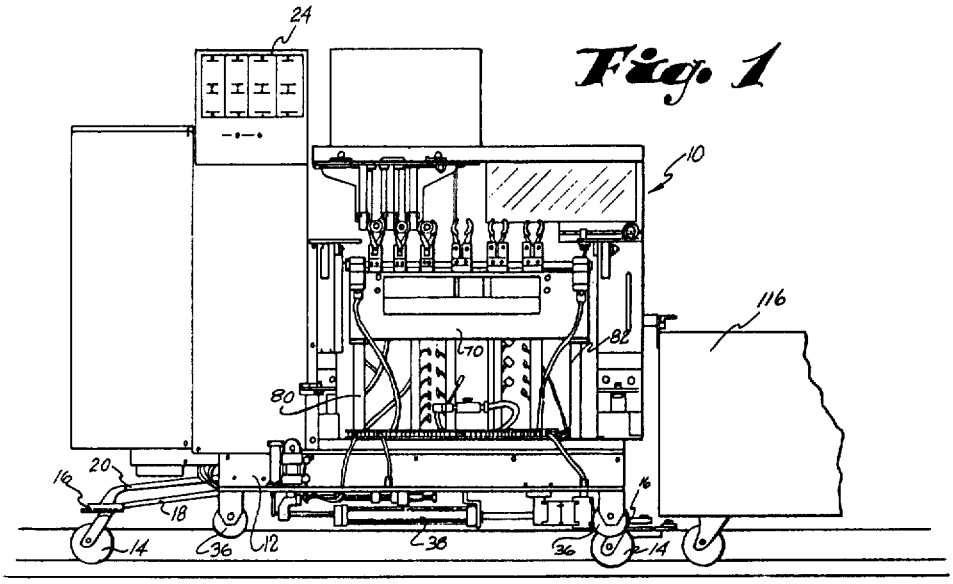
Fig. 1
Fig. 2
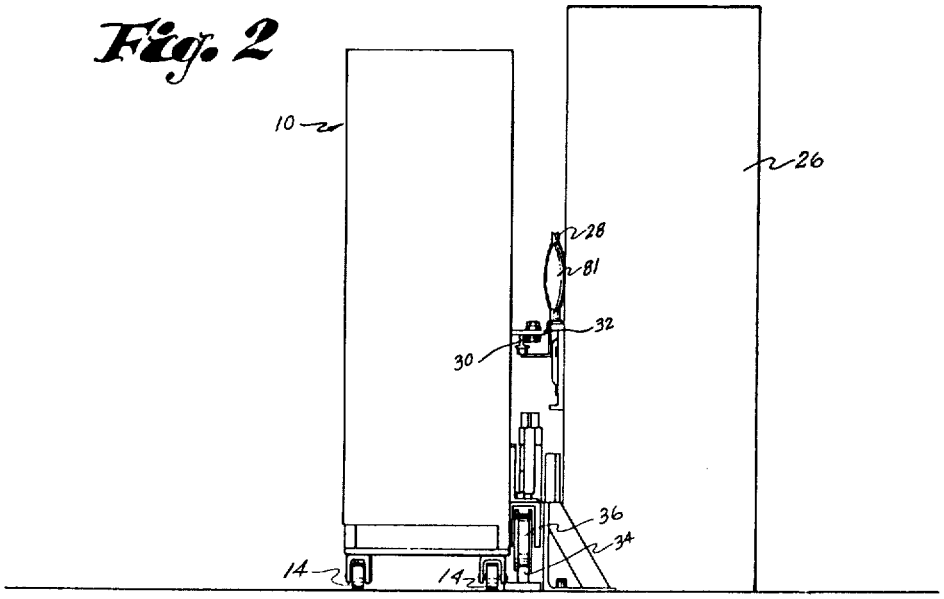

DOFFER WITH PNEUMATIC CONTROL SYSTEM

Matter enclosed in heavy brackets [ ] appears in the original patent but forms no part of this reissue specification; matter printed in italics indicates the additions made by reissue.

BACKGROUND OF THE INVENTION

When the bobbins on the rotating spindles of a spinning frame have been filled with yarn, the operation of the spinning frame is stopped and all of the filled bobbins are doffed and replaced with empty bobbins to be filled during subsequent operation of the spinning frame. Since this doffing and donning operation must be carried out at relatively frequent intervals, and since the manual doffing and donning of bobbins is both difficult and time consuming, some manufacturers of modern spinning frames also produce complementary automatic doffing machines which are specifically designed as an intergral part of a particular spinning frame. By designing a spinning frame and a doffing machine for integral use with one another, it is usually feasible to control the doffing machine electrically, using carefully designed and relatively safe electrical components (e.g. solenoid operated valves) operated by the existing electrical system in the spinning frame. An example of an integrated spinning frame and doffing equipment is disclosed in U.S. Pat. No. 3,609,952, issued Oct. 5, 1971.

However, there are a very large number of spinning frame currently in use which are of varying types, and which were not designed for integral use with automatic doffing machines. In the majority of instances, these spinning frames are doffed manually, with a workman simply walking along a row of spinning frame spindles and manually removing the full bobbins and placing empty bobbins on the spindles, all of which is burdensome for the workman and requires a significant expense in terms of labor.

In an effort to deal with the problem of manually doffing and donning bobbins in conjunction with a wide variety of different spinning frames, a number of semi-automatic and automatic doffing machines have heretofore been proposed, and these machines have met with varying degrees of success. For example, U.S. Pat. No. 2,175,349, issued Mar. 30, 1935, to Escursell-Prat, discloses a doffing machine which is manually pushed along a spinning frame with a combination of cams, gears and similar mechanical elements being used to control and operate the various components of the machines. While semi-automatic, mechanical operation has the advantages of simplicity and safe operation, it also suffers a significant disadvantage in that it is not entirely reliable in operation, particularly when it is designed to carry out predetermined sequential steps in doffing and donning the bobbins. More specifically, where a cam or similar operating element is relied upon to operate a plurality of follower members in a predetermined sequence, it is not uncommon for the sequence cam to fail to operate properly one or more of the followers, whereupon one or more of the steps in the sequential operation will not be carried out so that the doffing machine may jam or otherwise become inoperative until repaired. This problem is particularly acute where the sequence cam is moved or operated by a pneumatic motor receiving pressurized fluid from the existing mill compressed air system because even small variations in the pressure of such air system will adversely affect the operating relationship between the sequence cam and the followers therefor, as for example by increasing or decreasing the dwell time during which a follower is engaged by the moving sequence cam.

Some prior art doffing machines rely upon electrical power to operate or control some of the elements thereof, such as U.S. Pat. No. 2,886,940, issued May 19, 1959, U.S. Pat. No. 3,895,482, issued July 22, 1975, and U.S. Pat. No. 3,442,072, issued May 6, 1969. However, electrical systems used in doffing machines have two significant practical drawbacks. First, since the doffing machine is operated independently of the spinning frame, it must have its own source of electrical energy that is provided continuously during its travel along the entire length of a spinning frame. Customarily, such electrical energy is supplied by an electrical cord that is connected at one end to an available outlet at or near the spinning frame, and this electrical cord must then trail along the spinning room floor behind the doffing machine as it moves along the spinning frame, thereby creating a safety hazard to the operators of the spinning room equipment and other personnel who must walk along the floor space where the exposed electrical cord is located. Additionally, to the extent that an electrical control system for the doffing machine includes electrical switches having contacts which are opened and closed to control the operation of various elements of the doffing machine, the usual concentration of lint which is present in the environment of any spinning room may result in the electrical contacts becoming coated with a layer of such lint so that the contacts may not operate properly and may create a fire hazard.

In accordance with the present invention, the aforementioned drawbacks are eliminated by providing a doffing machine having a unique pneumatic control system for safely and reliably operating a plurality of coordinated movements in a predetermined sequence, with any particular step in the sequence occurring only after a predetermined preceding step or steps have been completed.

SUMMARY OF THE INVENTION

The doffing machine of the present invention includes a carriage member movable along an existing spinning frame and includes movable transport means for causing such movement. The carriage member has mounted thereon empty bobbin donning apparatus for engaging an empty bobbin from a supply and carrying such empty bobbin to a position at which it is loaded onto a spinning frame spindle. Additionally, a full bobbin doffing apparatus is provided for engaging and removing full bobbins from the spindles in a coordinated operation with the bobbin loading apparatus. Pneumatic sensor elements are arranged in the doffing machine to emit a stream of air into the path of the moving parts associated with the transporting, doffing and donning apparatus and to generate a signal each time such stream of air is interrupted by such moving parts. An air logic control system is provided for receiving the aforesaid signals, and for operating and transporting, doffing and donning apparatus in a predetermined sequence upon receipt of predetermined signals from the pneumatic sensors.

Preferably, the pneumatic sensors and the air logic control system are designed to operate at a very low air pressure (e.g. 5 p.s.i.g.) which provides a number of distinct advantages. First, there are no electrical hazards, as discussed above, and even less significant hazards which may result from the rupture of high pressure air lines are eliminated. Additionally, the control system is extremely reliable because only a few moving parts are included in the control system itself (e.g. the resilient diaphragms in the air logic control components), and even these movable parts are not significantly affected by line accumulation nor are they exposed to high pressures which could cause ruptures or malfunction thereof. Also, the use of low pressure air permits very effective filtration of the air, thereby providing a far more reliable operation of the air control system. Moreover, if the low pressure air logic system is supplied from an existing high pressure source available in a spinning room, this high pressure is substantially reduced before being admitted to the control system so that even relatively large variations in the high pressure supply will result in only small and generally insignificant variations in the air logic control system, whereby the air logic control system will continue to carry out its control functions without any adverse effect thereon or, at worst, the air logic control system will simply shut down rather than continuing to operate the doffing machine apparatus through an entire cycle in an improper manner, whereby the machine would probably be damaged and result in undesirable down time while it was being repaired. Finally, this air logic control system is relatively inexpensive to install and maintain.

In addition to the three basic operations of transporting the carriage, [and] donning [the] *and* doffing bobbins, the doffing machine of the present invention may include additional apparatus for unloading the doffed full bobbins, and for supplying empty bobbins to the bobbin loading apparatus. Since these additional operations all include moving parts, the present invention provides for disposing a pneumatic sensor to emit a stream of air into the path of such moving parts, and the air logic control system is designed to receive signals from these pneumatic sensors and to control these additional operations, together with the aforesaid three basic operations, so that all of the operations are carried out in a predetermined sequence.

Finally, the air logic control system of the present invention provides a unique manner of generating an alarm and/or stopping the operation of the doffing machine altogether when a predetermined number of signals are generated, each such signal indicating that the bobbin loading means has failed to load one or more bobbins onto a spinning frame spindle during each operating cycle of the doffing machine.

BRIEF DESCRIPTION OF THE DRAWINGS

FIG. 1 is a front elevational view of a doffing machine embodying the present invention;

FIG. 2 is a right side elevational view of the doffing machine shown in FIG. 1, and illustrates the relationship of the doffing machine with respect to a spinning frame;

DESCRIPTION OF THE PREFERRED EMBODIMENT

Figure 3:
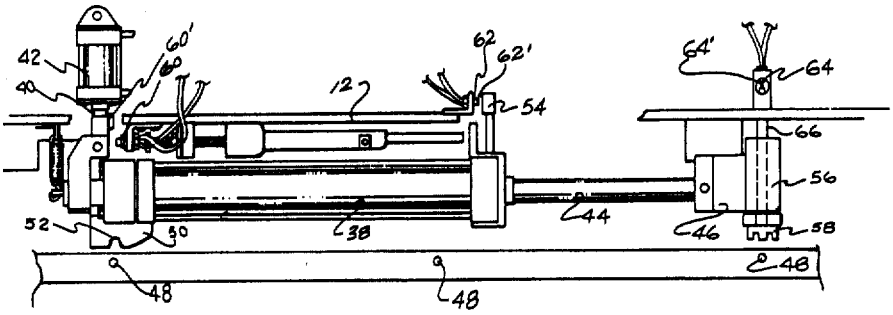
FIG. 3 is a detail view of the transport mechanism of the doffing machine shown in FIG. 1.

Looking now in greater detail at the accompanying drawings, FIGS. 1 and 2 illustrate a doffing machine 10 embodying the present invention, such doffing machine 10 including a carriage frame 12 having four wheels 14 mounted for relative vertical movement with respect thereto. The wheels 14 are mounted in pairs to cross pieces 16 fixed to pivoted arms 18 carried by the carriage frame 12, and each cross piece 16 is connected to a linkage member 20 fitted to a conventional fluid motor or cylinder (not shown). The carriage frame 12 may be raised with respect to the floor by the operator pressing the appropriate button (not shown) on the control panel 24 which admits pressurized fluid to the cylinder whereupon the linkage members 20 are moved outwardly to cause downward pivotal movement of the pivot arms 18 and raise the carriage frame 12. To lower the carriage frame 12, the operator presses another button on the control panel 24 which relieves the fluid pressure in the cylinder 20 to allow the linkage members 20 to be retracted by the weight of the carriage frame 12, whereby the carriage frame 12 is lowered.

A typical spining frame 26 having a row of upstanding spindles 28 is fitted with a guide rail 30 extending along the length thereof to receive a guide roller 32 fixed to the carriage frame 12 for guiding the carriage frame 12 during its movement along the spinning frame 26. An upstanding floor rail 34 is secured in place along the extending length of the spinning frame 26 and adjacent thereto, and the carriage frame 12 has mounted at the bottom thereof a pair of flanged guide wheels 36 for engaging the upstanding floor rail 34 as best seen in FIG. 2. To position the doffing machine 10 for operation, the carriage frame 12 is raised, as described above, and the operator then moves the doffing machine 10 to a position at one end of the spinning frame 26 with the guide roller 32 located above the guide rail 30 and with the guide wheels 36 located above the floor rail 34, and the doffing machine 10 is then lowered until the guide roller 32 and the guide wheels 36 rest upon the guide rail 30 and floor rail 34, respectively.

The doffing machine 10 is moved along the spinning frame in predetermined incremental steps by transport apparatus illustrated in FIG. 3. This transport apparatus includes a fluid cylinder 38 having the left-hand or trailing end thereof mounted to a vertical rod 40 extending from a fluid cylinder 42, th fluid cylinder 38 having a piston 44 extending therefrom to a pivoted connection with a block 46 fixed to the frame 12. The floor rail 34 has a plurality of spaced pins 48 extending therefrom, the spacing between the pins 48 corresponding to the distance which the doffing machine moves during each of its aforesaid increments of movement. The left-hand end of the fluid cylinder 38 has a depending flange 50 formed with a slot 52 for engaging the pins 48, and the right-hand end of the fluid cylinder 38 has a upstanding member 54 fitted at the top thereof with a block 56. The aforesaid fixed block 46 has a fluid cylinder 56 secured thereto for raising and lowering a bifurcated member 58, designed to engage the pin elements 48.

Disregarding for the moment the control of the transport apparatus and the sequence of operation thereof, all of which will be explained in greater detail below, the carriage frame 12 is moved along the floor rail 34 and the spinning frame 26 in the following manner. The bifurcated member 58 is lowered by its operating cylinder 56 to engage a pin element 48 located therebeneath, and, during a period when the carriage frame 12 is not moving, the transport cylinder 38 is operated to move to the right in FIG. 3 and relative to the carriage frame 12 along the piston rod 44 which is anchored by the bifurcated member 58. When the transporting fluid cylinder 38 has moved all the way to abut the fixed block 46, the slot 52 will be located above the center pin element 48 shown in FIG. 3, and the lifting cylinder 42 is then operated to lower the lifting piston 40 thereof until the slot 52 engages the center pin element 48. The lifting cylinder 56 is then operated to lift the bifurcated member 58 off of the right pin element 48, and the main transporting cylinder 38, which is now anchored at the center pin element 48 by slot 52, is again operated to move the piston rod 44 toward the right whereupon the entire carriage frame 12 is likewise moved to the right. It will be apparent that the transporting cylinder 38 has a movement extent which corresponds to the spacing between the pin elements 48 so that the carriage frame 12 will be moved along the spinning frame in predetermined increments represented by such spacing between the pin elements 48.

Figure 12:
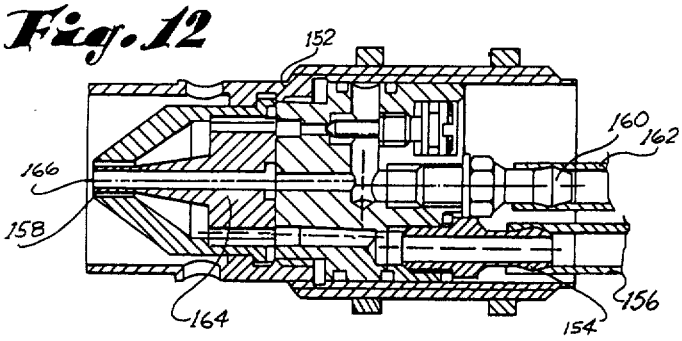
FIG. 12 is a detail view of a pneumatic sensor used in conjunction with the present invention.

Also associated with the transport apparatus are three pneumatic sensor elements, namely a first sensor element 60 located near the left end of the transport cylinder 38, a second sensor element 62 located near the right end of the transport cylinder 38, and a third sensor element 64 located above the bifurcated member lifting cylinder 56. These three sensor elements, and the other sensor elements to be described below, are all of identical and conventional construction, such as Micro-Sensor Type RML-5 manufactured by Festo-Maschinenfabrik G. Stoll, Berkheim, West Germany. As best seen in FIG. 12, each such pneumatic sensor includes a casing 152 in which an inlet nipple 154 is mounted for connection to one end of a flexible air inlet tube 156, the other end of the inlet tube 156 being connected to a source of low pressure air (not shown) whereby low pressure air flows through an annular outlet passage 158 as a constant stream of air directed along the axis of the casing 152. An outlet nipple 160 is located within the casing 152, and is connected to one end of a flexible outlet tube 162 that is connected at its other end to the control panel 24. The outlet nipple 160 communicates with a central bore 164 having an opening 166 located within the annular outlet passage 158. When the air stream flowing from the outlet passage 158 is interrupted, as by the proximate location of a surface disposed in such air stream, air is caused to flow into the opening 166, through the bore 164, and is transmitted by the outlet tube 162 to the control panel 24 for generating a pneumatic signal thereat.

As seen in FIG. 3, a first interruption plate 60' is mounted to the piston rod 40 extension, and is arranged so that in the raised position of the transporting cylinder 38 it is out of the fluid stream emitted from the first sensor 60. However, when the left end of the transporting cylinder 38 is lowered, as described above, the first interruption plate 60' interrupts such air stream and generates a pneumatic signal which is transmitted back to the control panel 24. Likewise, the surface 62' of the upstanding member 54 faces the second sensor 62 so that a pneumatic signal is generated thereby when the transporting cylinder 38 is moved to its furthest leftward position as shown in FIG. 3, that is after the carriage frame 12 has completed an increment of movement as described above. A vertically disposed interruption rod 66 is slidably carried in the lifting cylinder 56 and the bifurcated member 58 for vertical movement with respect thereto, the lower end of the rod 66 being located within the bifurcated member 58 so that when it engages a pin element 48 the rod 66 will strike the pin element 48 and be moved upwardly with the upper surface 64' thereof moving into close proximity to the fixed sensor element 64 to generate a pneumatic signal. The signals generated by the sensor elements 60, 62 and 64 are used to control the operation of the doffing machine 10, as will be explained in detail below.

Figure 4:
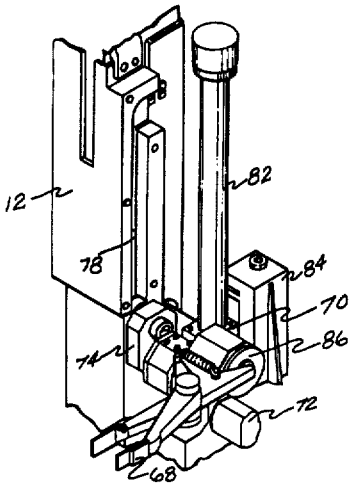
FIG. 4 is a detail view of a portion of the bobbin donning and doffing apparatus of the doffing machine shown in FIG. 1.
Figure 5:
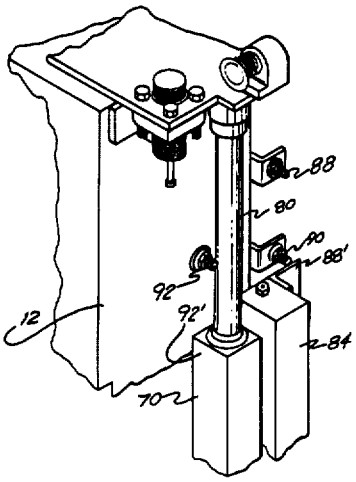
FIG. 5 is a detail view of another portion of the bobbin donning and doffing apparatus of the doffing machine shown in FIG. 1.
Figure 8:
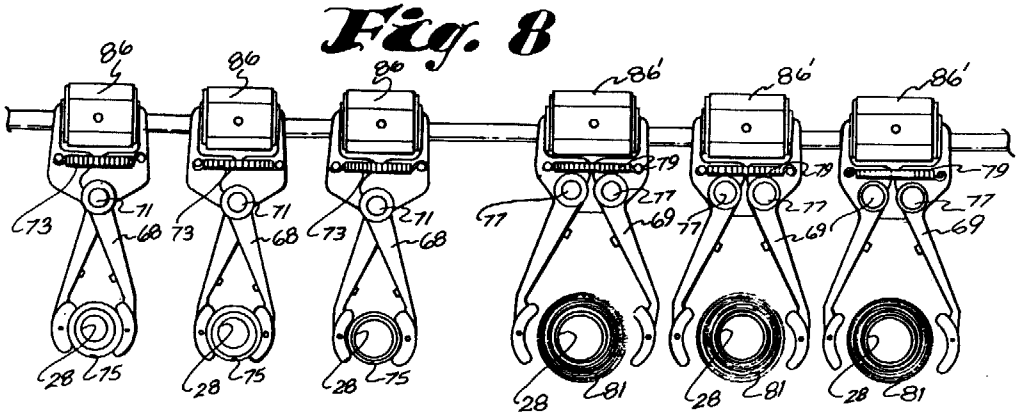
FIG. 8 is a detail view illustrating the positions of the empty bobbin and full bobbin engagement apparatus.

The apparatus for loading and doffing bobbins in illustrated best in FIGS. 4, 5 and 8, and this apparatus is mechanically quite similar to the loading and doffing mechanism disclosed in the aforementioned Gillono U.S. Pat. No. 3,442,072. A plurality of six pairs of clamps 68, 69 (see FIG. 8) are mounted on a subframe 70 that includes a horizontal rod 72 which is fixed to a pivot plate 74 having a roller 76 mounted thereon and carried in a guide slot 78 fixed to the carriage frame 12. The subframe 70 is arranged for vertical movement along guide rods 80, 82 located at each end thereon, the left guide rod 80 being illustrated in FIG. 4 and the right guide rod 82 being illustrated in FIG. 5. The subframe 70 is raised and lowered by cooperating movable elements 84 operated by fluid cylinders (not shown), and it will be noted that as the subframe 70 is moved upwardly the clamps 68, 69 will remain in a horizontal position until the roller 76 reaches the top of the slot 78 where the direction of movement of the roller 76 is altered ninety degrees to cause the pivot plate 74 to rotate ninety degrees, whereby the clamps 68, 69 are carried from a horizontal disposition, as shown in FIG. 4, to a vertical disposition as shown in FIG. 1.

As best seen in FIG. 8, the three pairs of clamps 68 are mounted for pivotal movement about a pivot rod 71, with a spring member 73 urging the clamps 68 to a normally open position. The rear ends of the clamps 68 each engage a fluid cylinder 86 which, when operated, expands outwardly to cause the clamps 68 to be closed against the bias of spring member 73 to engage the empty bobbins 75. Likewise, clamps 69 are mounted about pivot rods 77, and are normally urged to an open position as seen in FIG. 8 by spring members 79. Fluid cylinders 86', when operated, cause the clamps 69 to close for engaging full bobbins 81.

As best seen in FIG. 5, a fourth pneumatic sensor 88 is fixed to carriage frame 12 at a location above a fifth pneumatic sensor 90, and an interruption plate 88' is mounted on the right-hand element 84 for upward and downward movement therewith as the subframe 70 is raised and lowered as described above. The fourth and fifth sensore 88 and 90 are located so that the streams of air emitted therefrom will be interrupted by plate 88' when the subframe 70 is at its maximum raised and lowered positions, respectively. A sixth pneumatic sensor 92 is also fixed to the carriage frame 12 at a vertical location between the sensors 88 and 90, and the stream of air from the sixth sensor 92 is interrupted by the side face 92' of guide block 94 when the subframe 70 has been raised a predetermined height, this predetermined height being the height at which the full bobbins grasped by the clamps 69 have cleared the spindles 28 during unloading of the full bobbins.

Figure 6:
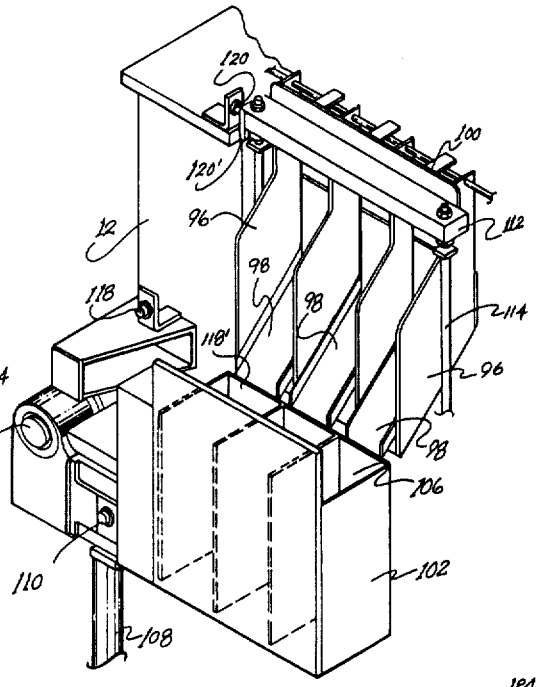
FIG. 6 is a detail view of the full bobbin unloading mechanism used in the doffing machine shown in FIG. 1.

FIG. 6 is a rear perspective view of the full bobbin unloader apparatus of the doffing machine 10, such full bobbin unloader apparatus including a fixed guide member 96 having three inclined chutes 98 extending downwardly from a horizontal support bar 100 on which full bobbins are laid by three of the clamps 69 when they are located at their raised vertical disposition described above. A throw box 102 is mounted on a pivot shaft 104, and includes three compartments 106 disposed adjacent to and beneath the chutes 98 when the throw box 102 is located at its horizontal position as shown in FIG. 6. A piston rod 108 extending from a fluid cylinder (not shown) is pivotally connected to the throw box 102 at 110. A push down bar 112 is mounted on vertical disposed guide rods 114, which are attached to cooperating fluid cylinders (not shown) to move the push down bar 112 from its lowest or retracted position shown in FIG. 6 to a raised or extended position above the horizontal support bar 100. In operation, the push down bar 112 is moved to its raised or extended position, and three full bobbins are then placed on the horizontal support bar 100 by the three clamps 69 with the ends of the full bobbins extending therebeyond to a position beneath the push down bar 112. The push down bar 112 is then lowered to its retracted position to strike the ends of the full bobbins and tip them over so that they will fall into the chutes and slide into the three compartments 106. The piston rod 108 is then operated to pivot the throw box 102 about pivot shaft 104 one hundred degrees whereby the throw box 102 is moved from its horizontal or retracted position as shown in FIG. 6 to an approximately vertical or extended position. This pivotal movement of the throw box 102 causes the full bobbins to be thrown from the compartments 106 toward the left in FIG. 6 where a box 116 (see FIG. 1), detachably connected to the doffing machine 10 at the leading end thereof, receives and collects such full bobbins.

A seventh pneumatic sensor 118 is mounted on the carriage frame 12, and is disposed to emit a stream of air into the path of the throw box 102 so that the back side wall 118' thereof interrupts such air stream when the throw box 102 reaches its aforesaid vertical or extended position. An eighth pneumatic sensor 120 is also mounted to the carriage frame 12 so that its air stream will be interrupted by an interrupter plate 120', fixed to the push down bar 112, when the push down bar 112 reaches its lowest or retracted position as shown in FIG. 6.

Figure 7:
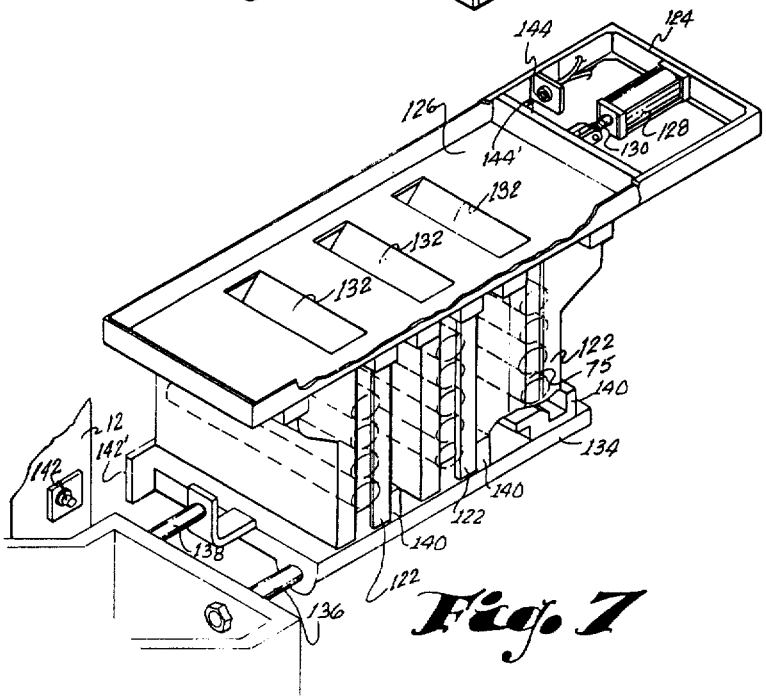
FIG. 7 is a detail view of the empty bobbin supply apparatus of the doffing machine shown in FIG. 1.

FIG. 7 illustrates the empty bobbin supply apparatus which includes three vertical empty bobbin channels 122, and a stationary frame 124 mounted thereabove for slidably receiving a movable loading tray 126 that is moved back and forth in a horizontal path by a fluid cylinder 128 fixed to the stationary frame and having a piston rod 130 connected to the slidable loading tray 126. The loading tray 126 is formed with three slots 132, and a supply of empty bobbins is carried in a detachable hopper (not shown) located directly above the loading tray 126, with the axes of the empty bobbins in the hopper extending in a direction parallel to the lengthwise dimensions of the slots 132. The back and forth movement of the loading tray 126 causes three of the empty bobbins in the hopper to fall into slots 132 and to be carried thereby until the loading tray 126 reaches its extended or left-hand position as shown in FIG. 7 where the slots 132 are aligned with the vertical channels 122 so that the empty bobbins will fall into such vertical channels 122. An empty bobbin magazine 134 is located at the lower end of the vertical channels 122, and is also mounted for back and forth horizontal movement on guide rods 136, a piston rod 138 extending from a fluid cylinder (not shown) being utilized to move the magazine 134 back and forth. The magazine 134 has three U-shaped empty bobbin supports 140 carried thereon, and these U-shaped supports 140 are arranged on the magazine 134 so that in the extending position thereof, shown in FIG. 7, the U-shaped supports 140 are not directly beneath the vertical channels 122. However, when the magazine 134 is moved toward the left in FIG. 7 by the piston rod 138 to its retracted position, the U-shaped supports 140 will move to a position directly beneath the vertical channels 122 and an empty bobbin will then fall into each of the U-shaped supports 140 from which they are picked up and loaded onto spindles 28 by three of the clamps 68, as will be described below.

A ninth pneumatic sensor 142 is mounted to emit a stream of air into the path of an interruptor plate 142' carried by the magazine 134 so that such air stream is interrupted by the plate 142' when the magazine 134 moves to its left or retracted position. A tenth pneumatic sensor 144 is mounted in the stationary frame 124, and its air stream is interrupted by the end face 144' of the loading tray 126 when it reaches its right or retracted position.

Figure 9:
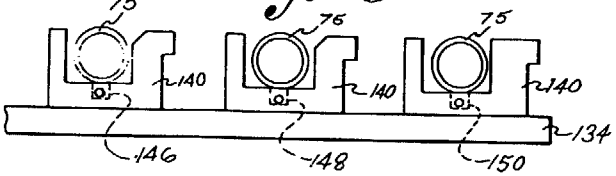
FIG. 9 is a detail view of one empty bobbin support associated with the empty bobbin supply apparatus shown in FIG. 7.

As shown in greater detail in FIG. 9, the three abovedescribed U-shaped bobbin supports 140 mounted on the magazine 134 have eleventh, twelfth and thirteenth pneumatic sensors 146, 148 and 150 mounted therein, respectively, for emitting a stream of air upwardly, and each of these streams of air is interrupted each time an empty bobbin falls into the U-shaped bobbin supports 140 from the three vertical channels 122, as described above, whereby a pneumatic signal is generated to indicate the presence of an empty bobbin in the U-shaped bobbin supports 140.

Figure 10:
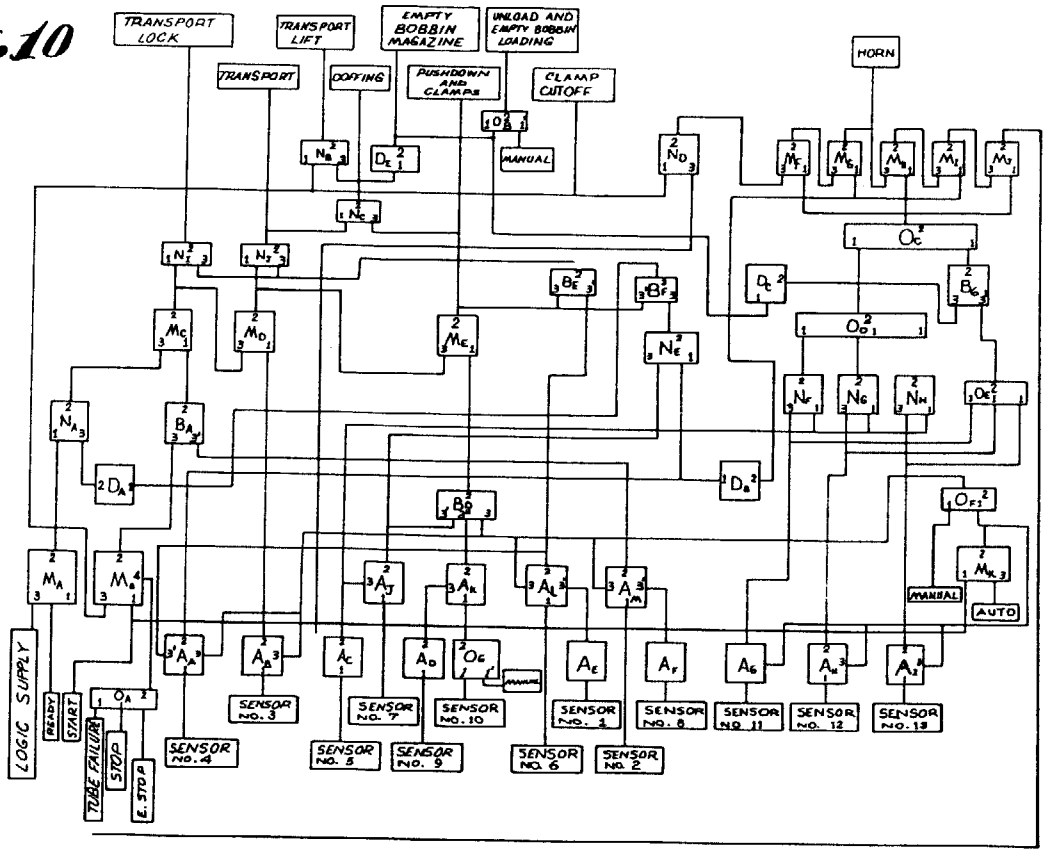
FIG. 10 is a diagrammatic illustration of the air logic control system of the present invention.
Figure 11:
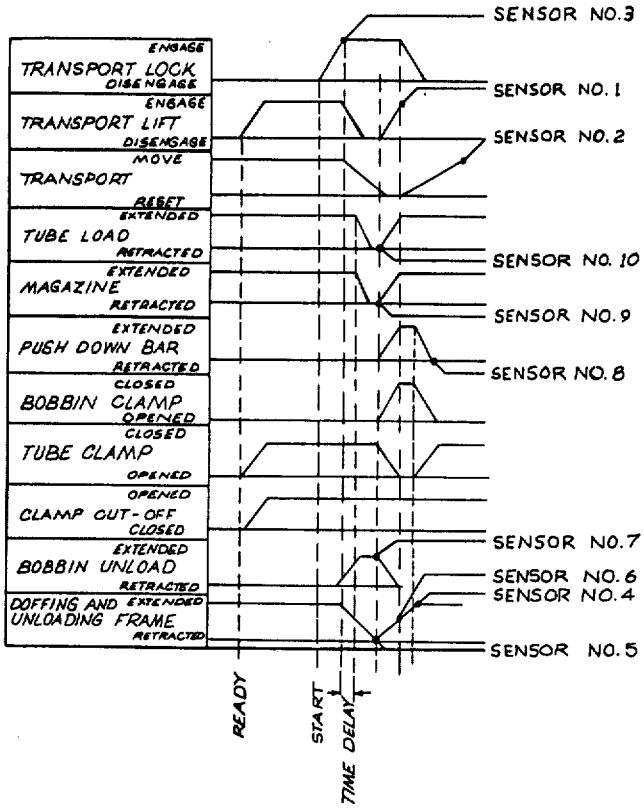
FIG. 11 is a diagrammatic illustration of the sequence of operation of the doffing machines of the present invention.

The operation and control of the doffing machine 10 will now be described in conjunction with FIG. 10 which is a diagrammatic illustration of the air logic control system of the present invention, and FIG. 11 which illustrates diagrammatically the sequence of operation of the various elements of the doffing machine 10. In FIG. 10, the conventional components of the air logic system are identified as follows:

I. M—Memory Circuits

1—input signal
3—conditional signal
4—conditional signal
2—output signal (when 1 and 3 received, but not 4)

II. A—Amplifier Circuits

1—input signal
3—conditional signal
2—output signal (when 1 and 3 received)

III. B—Conditional Gate Circuits

3—input signal
2—output signal (when all 3's received)

IV. N—Not Gate Circuit

1—input signal
3—conditional signal
2—output signal (when 1 and not 3 received)

V. D—Circuit

1—input signal
2—output signal (when 1 received, and after constant time delay)

VI. O—Or Circuit

1—input signal
2—output signal (when any 1 received)

As described above, the doffing machine 10 is first mounted on the guide rail 30 of the spinning frame 26 at one end thereof with the guide wheels 36 positioned on the floor rail 34 as shown in FIG. 2. A supply hose (not shown) containing compressed air (e.g. at about 80 p.s.i.) from the existing mill supply or other source is attached to the doffing machine 10 to operate the fluid motors thereof, and the pressure of this compressed air is substantially reduced (e.g. to 5 p.s.i.g.) for use in the air logic control system shown in FIG. 10. The spinning frame 26 is then prepared for bobbin doffing and donning in the usual manner, and the full bobbins on the first three spindles 28 of the spinning frame 26 are manually doffed by the operator to provide three empty spindles 28 on which empty bobbins can be donned automatically by the doffing machine 10.

The operator then turns a selector switch on the control panel 24 to energize the logic system with low pressure air, this energization being represented by "Logic Supply" in FIG. 10 sending a signal to Ma3. The operator then presses a "Ready" button on the control panel 24 which sends a signal to Ma1 which sets Ma and causes an output signal to be generated at Ma2. This output signal is then applied simultaneously to Mb3, directly to "Clamp Cutoff," to Mf3 through Nd, to "Engage Transport Lift" through Nb, and to Mc3 through Na.

It is to be noted at this point that the cylinder for operating the "Clamps" in the block identified as "Pushdown And Clamps" includes a conventional two-way valve (not shown) which alternatively admits air to close either the three clamps 68 which handle the three empty bobbins or to close three clamps 69 which handle the three full bobbins, so that in normal operation one of the other of these clamps 68, 69 are always closed. However, as a safety feature, it is desirable to make sure that both clamps 68, 69, which are open when the operating cylinders 86 therefor are not energized, are open at the very start of operation in case there is some preliminary movement of the clamps 68, 69 which could interfere with or inadvertently hit other components of the doffing machine 10 as it moves to its initial or ready position. Accordingly, the "Clamp Cut-Off" is a conventional valve (not shown) which is placed in series with the aforesaid clamp valve to prevent any air whatever being admitted to the clamp valve at the beginning of the doffing machine operation. Thus, looking at the sequence chart in FIG. 11, the "Clamp Cut-Off" is closed when the air is first admitted to the logic circuit whereby no air is admitted to the clamp valve so that all six clamps remain open. When the "Ready" button is pressed, a signal is sent to the "Clamp Cut-Off" from Ma2 as described above, and the clamp out off valve opens to admit air to the clamp valve, which is normally at a position to close the empty bobbin clamps and permit the full bobbin clamps to open, whereby the empty bobbin clamps close to engage three empty bobbins being supported in the U-shaped bobbin supports 140 (FIG. 7).

Returning to the signal generated at Ma2, this signal is transmitted through Nb to "Engage Transport Lift" which operates the fluid cylinder 42 (FIG. 3) to lower the right-hand end of transport cylinder 38 until the slot 52 engages the left pin element 48 in FIG. 3. This operation causes the plate 60' to interrupt the air stream of first sensor 60 and send a signal "Sensor No. 1" through Ae to Al3. Additionally, since the transport cylinder 38 is at its left position in FIG. 3, second sensor 62 is interrupted by 62' to send a signal "Sensor No. 2" to Am1. Since no signal is received at Al1 or Am3, nothing further happens.

The operator then selects the "Auto" mode of operation and presses the "Start" button on the control panel 24. The "Start" button simultaneously applies a signal to Mb1, to Nd3 (which inhibits the output from Nd2), and Mk1. If there is no signal at Mb4, an output signal is generated at Mb2 and transmitted to Ba3. It will be noted, however, that a safety feature is introduced by providing that if the operator presses the "Stop" button or the "E Stop" (emergency stop) button, or if a signal representing "Tube Failure," as described below, is received at any "1" of Oa, a signal is generated at Oa2 which is transmitted to Mb4 to cancel the "Start" signal received at Mb1 and thereby stop further operation of the doffing machine 10.

The aforesaid "Auto" (automatic operation) button applies a signal at Mk3, which combines with the previous signal received at Mk1, to generate a signal at Mk2 which is applied to Ag3, Ah3, and Ai3, and to Of1 which generates a signal at Of2 that is transmitted simultaneously to Am3, Al3', Ab3, Aa3 and Bd3.

Since the pushdown bar 112 is normally at its retracted or down position, eighth sensor 120 is interrupted by plate 120' to generate a signal "Sensor No. 8" that is applied through Af to Am3' which generates a signal at Am2 that is applied to Ba3' producing a signal at Ba2 that is applied to Mc1. Since a signal has previously been received at Mc3, a signal is generated at Mc2 and applied to Md3 and to "Engage Transport Lock" through Ni whereby fluid cylinder 56 causes bifurcated member 58 to be lowered until it engages a pin element 48, thereby raising rod 66 to interrupt the air stream of third sensor 64 and generating a signal "Sensor No. 3."

The signal "Sensor No. 3" is applied to Ab1 and since Ab3 has previously received a signal, a signal is generated at Ab2 and transmitted to Md1 to generate a signal at Md2, which is applied at Me3 and Nj1. The signal applied at Nj1 causes an output signal to be generated at Nj2 thereof which is transmitted to Nc1 that generates a signal at Nc2 that is transmitted to Nb3 which removes the output signal at Nb2 whereby the "Engage Transport Lift" is reversed to cause the fluid cylinder 42 to raise the right end of transport cylinder 38 until slot 52 disengages the right pin element 48 in FIG. 3.

The aforesaid output signal at Nj2 is also applied directly to "Transport" which causes the transport cylinder 38 to be moved toward the right in FIG. 3, relative to the carriage frame 12 which is anchored by the bifurcated member 58.

The signal from Nc2 is also transmitted to "Doffing" whereby the subframe 70 is moved downwardly by the fluid cylinders for elements 84. As previously described, this downward movement of the subframe 70 results in the clamps 68, 69 being rotated from a vertical disposition to a horizontal disposition, with the clamps 68 closed and carrying three empty bobbins which are loaded onto the three empty spindles 28 and with the clamps 69 open and moving to a position about, and spaced from, three full bobbins located on the three next adjacent spindles.

The aforementioned signal generated at Nc2 is also simultaneously transmitted to De1 which, after a predetermined time delay, transmits a signal to "Empty Bobbin Magazine" and to Ob1. The signal to "Empty Bobbin Magazine" causes the fluid cylinder for piston rod 138 (FIG. 7) to be energized whereby the magazine 134 is moved to its left or retracted position in FIG. 7 to permit empty bobbins to fall into the three U-shaped supports 140 while the subframe 70 is moving downwardly. Likewise, the signal transmitted to Ob1 generates a signal at Ob2 which transmits a signal to "Unload And Empty Bobbin Loading" to cause the fluid motor 128 to move the loading tray 126 from its right extended position to its left retracted position in FIG. 7, and to energize the fluid cylinder for piston rod 108 which causes the throw box 102 to be rotated from its horizontal to its vertical position.

Since, as just described, several components are moving simultaneously, several of the pneumatic sensors are also caused to generate signals generally simultaneously. Thus, when the subframe 70 reaches its lowest position, the air stream of fifth sensor 90 is interrupted by surface 88' to generate a signal "Sensor No. 5," and when the throw box 102 reaches its vertical disposition, the seventh sensor 120 is interrupted by plate 120' to generate a signal "Sensor No. 7." When loading tray 126 moves to its retracted position, tenth sensor 144 is interrupted by end face 144' to generate a signal "Sensor No. 10," and when magazine 134 moves to its retracted position, ninth sensor 142 is interrupted by plate 142' to generate a signal "Sensor No. 9."

The signal from "Sensor No. 5" is transmitted through Ac to Aj3, and the signal from "Sensor No. 7" is transmitted to Aj1, whereby an output signal is generated at Aj2 and applied to Bd3' and to Ne3. Also, the signal from "Sensor No. 9" is transmitted through Ad to Ak3, and the signal from "Sensor No. 10" is transmitted to Ak1 through Og1 and Og2, whereby an output signal is generated at Ak2 and applied to Bd3.

Since all three of the conditional signals for Bd have now been received, a signal will be generated at Bd2 which is transmitted to Me1, which, having previously received a conditional signal at Me3, will generate an output signal at Me2. This output signal is transmitted directly to "Pushdown And Clamps" which simultaneously causes the three empty bobbin clamps 68 to be opened by cylinders 86, the three full bobbin clamps 69 to be closed about three full bobbins on the spindles 28, and the push down bar 112 to be raised by rods 114.

Also, the signal generated at Me2 is transmitted to Nc3 which removes the signal at Nc2, whereby reversing the above-described operation by causing the "Doffing" subframe 70 to begin moving to its raised position, causing the "Engage Transport Lift" cylinder 42 to lower the lift end of transport cylinder 38 until slot 52 engages the middle pin element 48, causing the "Unload" throw box 102 to return to its horizontal disposition, causing the "Empty Bobbin Magazine" 134 to return to its extended position, and causing the "Empty Bobbin Loading" tray 126 to return to its extended position.

The aforesaid signal generated at Me2 is also applied at Be3 and Bf3'. When the now upwardly moving subframe 70 reaches the previously described predetermined height, sixth sensor 92 will be interrupted by surface 92' to generate a signal "Sensor No. 6" that is applied to Al1, and since conditional signals have been previously applied at Al3' and Al3 from "Sensor No. 1" and from Of2, a signal is generated at Al2 and transmitted to Al3, and to Be3' whereby an output signal is generated at Be2. This output signal at Be2 is applied to Ni3 and Ni3 which removes the previous output signals at "Engage Transport Lock" and at "Transport" so that the cylinder 56 is raised until bifurcated member 58 clears the right pin element 48 and so that the transport cylinder 38 is energized to push piston rod 44 therefrom toward the right and thereby cause the carriage frame 12 to be moved along the spinning frame by the aforesaid predetermined increment of movement.

When the subframe 70 reaches its fully raised position, fourth sensor 88 is interrupted by plate 88' to generate a signal "Sensor No. 4" which causes an input signal to be received at Aa1 and an output signal to be generated at Aa2 (Aa3 and Aa3' having previously received signals from Of2 and Al2, respectively). The output signal from Aa2 is applied to Ne1 and an output signal is generated at Ne2 since the inhibit at Ne3 is removed by "Sensor No. 5" being removed when the subframe 70 starts upwardly, the signal at Aj3 likewise being removed to remove the output signal at Aj2. The output signal generated at Ne2 is transmitted to Bf3 and an output signal is generated at Bf2 since a signal at Bf3' had been previously received from Me2. This output signal from Bf2 is applied to Na3 through time delay Da so as to inhibit Na and remove the output signal at Na2. By removing the output at Na2, all of the memory circuits Mc, Md and Me are reset to begin an entire new cycle. It will be noted that when Me is reset, the output at Me2 is removed from "Pushdown and Clamps" so that fluid cylinders 86 are energized to close three empty bobbin clamps 68 to engage three new empty bobbins in the U-shaped supports 140, the three full bobbin clamps 69 are opened by de-energizing fluid cylinders 86' to release the full bobbins which are positioned on the horizontal support bar 100, and the push down bar 112 is lowered to its retracted position to strike the ends of the full bobbins on support bar 100 and cause them to fall into the chutes 98 and compartments 106.

Since inadvertent jamming of the loading tray 126, while undesirable, does not directly affect the doffing of the full bobbins and may be difficult to correct in an aisle between adjacent spinning frames, the present invention provides a "manual" switch which the operator can press to by-pass the operation of the loading tray 126 altogether and permit the doffing machine to continue its doffing operation, even though no further empty bobbins will be donned onto the spindles 28. As seen in FIG. 10, a continuously "manual" signal may be selectively applied by the operator to Og1' which has the same effect as if the "Sensor 10" signal were being continuously applied to Ak1 through Og. Thus, the jamming of the loading tray 126 would ordinarily prevent a signal being generated at "Sensor 10" and would stop the further operation of the doffing machine. By operating the "manual" switch, a continuous signal is applied to Og1' whereby the doffing machine will continue to operate, but without the loading tray 126 supplying empty bobbins to the vertical bobbin channels 122.

It will be seen from the above that the plurality of pneumatic sensors and the air logic control system provides a control for the doffing machine 10 which is safe, reliable, and relatively inexpensive, and virtually foolproof. It is to be particularly noted that each of the various movements of the doffing machine components will interrupt a stream of air from one of the sensors to generate a pneumatic signal, and these signals are received by the logic control system in a manner which assures that the various movements of the doffing machine components must occur in an exact predetermined sequence. For example, during the continuous operating cycle of the doffing machine 10, the subframe 70 cannot begin its downward or bobbin loading movement unless the carriage frame 12 has been moved along the spinning frame 26 for a predetermined increment of movement during the preceding cycle. The subframe 70 cannot begin its upward or full bobbin doffing movement until the subframe 70 has reached its lowest position to complete the empty bobbin loading step, it being noted in FIG. 10 that the "Doffing" block does not receive a signal to raise the subframe 70 until an output signal is generated at Me2, and this output signal is generated only after a conditioning signal is received at Aj3 from "Sensor No. 5." Moreover, the transport cylinder 38 cannot begin to move the carriage frame 12 along the spinning frame 26 until a conditioning signal is received from "Sensor No. 6," as described above in connection with FIG. 10. The movement of the throw box 102, the loading tray 26, and the magazine 134 are likewise conditioned upon receipt of a predetermined signal from "Sensor No. 5," so that all of the component movements are dependent upon the movement of another predetermined component interrupting the air stream of a selected pneumatic sensor.

In accordance with a further feature of the present invention, a specific control is imposed upon the doffing machine 10 if, for any reason, a predetermined number of empty bobbins are not loaded on the spinning frame spindles 28 during one pass of the doffing machine down the row of spindles 28. It will be recalled that each of the three U-shaped empty bobbin supports 140 has a pneumatic sensor located therein, namely the eleventh sensor 146, the twelfth sensor 148, and the thirteenth sensor 150 described above. Looking at FIG. 10, when "Sensor No. 5" generates a signal indicating that the subframe 70 is at its lowest position, whereby three empty bobbins should have dropped into the U-shaped supports 140 as described above, the output from Ac2 is transmitted to Nf1, Ng1, and Nh1. If a bobbin is present in all three U-shaped supports 140, signals "Sensor No. 11," "Sensor No. 12" and "Sensor No. 13" will cause a signal to be transmitted to Nf3, Ng3 and Nh3 through Ag, Ah and Ai, respectively, which have previously received conditional signals from Mk2, whereby no signal will be generated at Nf2, Ng2 or Nh2, and nothing further happens.

If, however, an empty bobbin fails to fall into one or more of the three U-shaped supports 140, no signal will be generated at one or the others of Ag, Ah or Ai, and no signal will be received at one or the others of Nf, Ng or Nh. Therefore, one or more signals will be generated at Nf2, Ng2 or Nh2 and transmitted to Mf1 through Od and Oe. Since Mf3 will have previously received a signal from Ma2 as described above, a signal will be generated at Mf2 and transmitted to Mg3. At the end of each operating cycle of the doffing machine 10, a signal will be generated at "Sensor No. 4," as described above, and transmitted to Mg1, whereupon an output signal will be generated at Mg2. This output signal may be used to sound a "Horn" or similar alarm indicating that, during any one cycle, one or more bobbins failed to fall in the U-shaped supports 140 whereby one or more of the spinning frame spindles 28 will not have been properly loaded, and this output signal may also be transmitted to Mh3 and remain as a conditional signal thereat. If during any succeeding cycle of the doffing machine 10, one or more empty bobbins fail to fall into the three U-shaped supports 140, a signal will be imposed on Mh1 in the same manner as that described immediately above. Likewise, if during still another succeeding cycle one or more empty bobbins do not fall into the three U-shaped supports 140, a signal will be imposed on Mj1, generating a signal at Mj2 which is transmitted back to Oa1 which causes a signal to be generated at Oa2 and transmitted to Mb4 to stop immediately the entire operation of the doffing machines 10, as described above.

Thus, the control system is designed to receive a first signal (e.g. "Sensor No. 11") each time one or more empty bobbins are disposed in the U-shaped supports 140 during any given cycle, to receive a second signal (e.g. "Sensor No. 4") at the completion of each cycle, and to generate a third signal (e.g. Mf2) when the first and second signals are not present simultaneously. This third signal may be used to sound a horn, and to stop the operation of the doffing machine altogether when a predetermined member of such third signals have been generated. In the disclosed embodiment, this predetermined number is three, thereby stopping operation when three to nine empty bobbins have not been properly loaded, but it is to be understood that this predetermined number could be other than three by varying the number of memory circuits similar to Mf.

Using much of the same parts of the air logic control system, the present invention also provides for sounding an alarm and/or stopping the operation of the machine when empty bobbin tubes are located in the U-shaped supports 140 when they should not be. Thus, when the output signal from De2 is transmitted to "Empty Bobbin Magazine," the tube magazine 134 begins to move to its retracted position and should not have any empty bobbins located in the U-shaped supports 140. This output signal from De2 is also transmitted to Bg3 through time delay Dc. If an empty bobbin is improperly located within any one of the three U-shaped supports 140, signal "Sensor No. 11," and/or "Sensor No. 13" will generate a signal to Bg3' through Ag2, Ah2 and/or Ai2, respectively, and Oe2, thereby generating a signal at Bg2 which is transmitted to Mf1, Mh1 and/or Mj1 through Oc to sound the "Horn" or stop the operation of the doffing machine 10 in the same manner described above. It will be noted that the air logic control system generates a third signal (e.g. Mf2) whenever it receives, simultaneously, a first signal (e.g. De2) indicating the tube magazine 134 is returning to its retracted position to receive additional empty bobbins, and a second signal (e.g. "Sensor No. 11") indicating that the tube magazine 134 already has an empty bobbin in one or more of the U-shaped supports 140. When a predetermined number of such third signals have been generated, an alarm will sound, or the operation of the doffing machine 10 is stopped.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

We claim:

1. Apparatus for donning and doffing bobbins onto and off of the spindles of a spinning frame, said apparatus including:

(a) carriage means having transport means movable to a first position for causing said carriage to move along said spinning frame;

(b) bobbin donning and doffing means carried by said carriage means and arranged for initial movement to a first position at which at least one empty bobbin is donned onto a spindle and released, and for subsequent movement to a second position at which at least one full bobbin is doffed from a spindle;

(c) pneumatic sensor means disposed to emit a stream of air into the paths of movement of said transport means and said bobbin donning and doffing means, said sensor means generating first, second and third pneumatic signals each time said steam of air is interrupted by said transport means moving to said first position thereof, by said donning and doffing means moving to said first position thereof, and by said donning and doffing means moving to said second position thereof, respectively; and (d) control means receiving said pneumatic signals and operable:

(i) to move said donning and doffing means to said first position thereof only after said first pneumatic signal has been received;

(ii) to move said donning and doffing means to said second position thereof only after said second pneumatic signal has been received; and (iii) to move said transport means to said first position thereof only after said third pneumatic signal has been received.

2. Apparatus for donning and doffing bobbins as defined in claim 1 and further characterized in that said apparatus includes unloader means for receiving full bobbins doffed by said bobbin donning and doffing means, said unloader means being movable from a first position for receiving said full bobbin to a second position for ejecting said full bobbins, in that said pneumatic sensor means emits a stream of air into the path of said unloader means for generating a fourth signal each time said airstream is interrupted by the movement of said unloader means moving to said second position thereof, and in that said control means is operable to move said bobbin donning and doffing means to said second position thereof only after said second pneumatic signal and said fourth pneumatic signal have been received.

3. Apparatus for donning and doffing bobbins as defined in claim 1 and further characterized in that said apparatus includes empty bobbin supply means for supplying empty bobbins to said bobbin donning and doffing means, said bobbin supply means being movable from a first position to receive an empty bobbin to a second position to supply an empty bobbin to said bobbin donning and doffing means, in that said pneumatic sensor means emits a stream of air into the path of said bobbin supply means for generating a fifth signal each time said airstream is interrupted by the movement of said bobbin supply means to said second position thereof, and in that said control means is operable to move said bobbin donning and doffing means to said second position thereof only after said second pneumatic signal and said fifth pneumatic signal have been received.

4. Apparatus for donning and doffing bobbins as defined in claim 3 and further characterized in that said empty bobbin supply means includes at least one cradle means for receiving and supporting an empty bobbin, in that said pneumatic sensor means emits a stream of air into the path of said empty bobbin as it is received by said cradle means and for generating a seventh signal each time said bobbin donning and doffing means moves to said second position thereof and said airstream in the path of said empty bobbin is not interrupted by said empty bobbin, and in that said control means is operable to prevent further movement of said transport means and said bobbin donning and doffing means upon receipt of a predetermined number of said seventh signals.

5. Apparatus for donning and doffing bobbins as defined in claim 4 and further characterized in that said empty bobbin supply means includes a plurality of said cradle means, and in that said pneumatic sensor means emits a stream of air into the path of each said empty bobbins received by each of said plurality of cradle means for generating said seventh signal each time said empty bobbin supply means moves to said first position thereof and said airstream in the path of any of said empty bobbins is not interrupted.

6. Apparatus for donning and doffing bobbins as defined in claim 1 and further characterized in that said transport means includes means associated therewith for selective engagement with an element fixed with respect to said spinning frame, said engaging means being movable between a first position out of engagement with said fixed element and a second position engaging said fixed element, in that said pneumatic sensor means emits a stream of air into the path of movement of said engaging means for generating a sixth signal each time said engaging means moves to said second position thereof, and in that said control means is operable to move said transport means to said first position thereof only after said third pneumatic signal and said sixth pneumatic signal have been received.

7. Apparatus for donning and doffing bobbins onto and off the spindles of a spinning frame, said apparatus including:

(a) carriage means having transport means movable to a first position for causing said carriage means to move along said spinning frame, said transport means including engaging means associated therewith for selective engagement with an element fixed with respect to said spinning frame, said engaging means being movable between a first position out of engagement with said fixed element and a second position engaging said [first] *fixed* element;

(b) bobbin donning and doffing means carried by said carriage means and arranged for initial movement to a first position at which at least one empty bobbin is donned onto a spindle and released, and for subsequent movement to a second position at which at least one full bobbin is doffed from a spindle;

(c) unloader means for receiving full bobbins doffed by said bobbin donning and doffing means, said unloader means being movable from a first position for receiving said full bobbins to a second position for ejecting said full bobbins;

(d) empty bobbin supply means for supplying empty bobbins to said bobbin donning and doffing means, said bobbin supply means being movable from a first position to receive an empty bobbin to a second position to supply an empty bobbin to said bobbin donning and doffing means;

(e) pneumatic sensor means disposed to emit a stream of air into the paths of movement of said transport means, said engaging means, said bobbin donning and doffing means, said unloader means, and said empty bobbin supply means, said sensor means generating:

(i) a first signal each time said airstream is interrupted by said transport means moving to said first position thereof;

(ii) a second signal each time said airstream is interrupted by said donning and doffing means moving to said first position thereof;

(iii) a third signal each time said airstream is interrupted by said donning and doffing means moving to said second position thereof;

(iv) a fourth signal each time said airstream is interrupted by [and] said unloader means moving to said second position thereof;

(v) a fifth signal each time said airstream is interrupted by said bobbin supply moving to said second position thereof; and (vi) a sixth signal each time said airstream is interrupted by said engaging means moving to said second position thereof;

(f) control means receiving said pneumatic signals and operable:

(i) to move said donning and doffing means to said first position thereof only after said first pneumatic signal has been received;

(ii) to move said donning and doffing means to said second position thereof only after said second, fourth and fifth pneumatic signals have been received; and (iii) to move said transport means to said first position thereof only after said third and sixth pneumatic signals have been received.

8. Apparatus for donning bobbins onto the spindles of a spinning frame, said apparatus including:

(a) carriage means having transport means for moving said carriage means along said spinning frame;

(b) support means for receiving and supporting at least one empty bobbin therein;

(c) bobbin donning means movable in a cycle to pick up an empty bobbin from said support means and to don said empty bobbin onto a spindle;

(d) pneumatic sensor means disposed:

(i) to emit a stream of air into said support means for generating a first signal when an empty bobbin is supported in said support means; and (ii) to emit a stream of air into the path of movement of said bobbin donning means to generate a signal upon the completion of said cycle thereof; and (e) control means receiving said first and second pneumatic signals and generating a third pneumatic signal each time said first and second pneumatic signals are not present simultaneously, said control means being operable to stop further movement of said carriage means and said bobbin donning means when a predetermined number of said third pneumatic signals are generated.

9. Apparatus for donning and doffing bobbins onto and off of spindles of a spinning frame, said apparatus including:

(a) carriage means having movable transport means for advancing *said means along* said spinning frame in sequential steps;

(b) bobbin donning means carried by said carriage means and movable to don empty bobbins onto said spinning frame spindle;

(c) bobbin doffing means carried by said carriage means and movable to doff full bobbins from said spinning frame spindles;

(d) pneumatic sensor means disposed to emit a stream of air into the paths of movement of said transport means, said bobbin donning means, and said bobbin doffing means, respectively, said sensor means generating a pneumatic signal each time said stream of air is interrupted by said movement of said transport means, said bobbin donning means, and said bobbin doffing means; and (e) control means receiving said pneumatic signals and operable to cause said movement of said transport means, said bobbin donning means, and said bobbin doffing means in a predetermined sequence.

10. Apparatus for donning bobbins onto the spindles of a spinning frame, said apparatus including:

(a) carriage means having transport means for moving said carriage means along said spinning frame;

(b) support means for receiving and supporting at least one empty bobbin therein, said support means being movable from a first position to a second position at which said empty bobbin is received;

(c) pneumatic sensor means disposed to emit a stream of air into said support means for generating a first pneumatic signal when an empty bobbin is disposed in said support means;

(d) means for generating a second pneumatic signal when said support means begins its movement from said first to second position thereof; and (e) control means receiving said first and second pneumatic signals and generating a third pneumatic signal each time said first and second pneumatic signals are present simultaneously, said control means being operable to stop further movement of said carriage means and said support means when a predetermined number of said third pneumatic signals are generated.

*11. Apparatus for doffing bobbins off the spindle of a spinning frame, said apparatus including:*

*(a) carriage means having transport means movable to a first position for causing said carriage to be moved along said spinning frame;*

*(b) bobbin doffing means carried by said carriage means and arranged for movement between a first position at which at least one bobbin on a spindle is engaged and*

*a second position to remove said engaged bobbin from said spindle;*

*(c) pneumatic sensor means disposed to emit a stream of air into the paths of movement of said transport means and said bobbin doffing means, said sensor means generating a first pneumatic signal each time said stream of air is interrupted by said transport means moving to said first position thereof and generating a second pneumatic signal each time said stream of air is interrupted by said bobbin doffing means moving from said first position to said second position thereof; and*

*(d) control means receiving said pneumatic signals and operable:*

*(i) to move said bobbin doffing means from first position to said second position thereof only after said first pneumatic signal has been received; and*

*(ii) to move said transport means to said first position thereof only after said second pneumatic signal has been received.*

*12. Apparatus for doffing bobbins as defined in claim 11 and further characterized in that said carriage means has supported therein unloader means for receiving full bobbins doffed by said bobbin doffing means, said unloader means being movable from a first position for receiving said full bobbin therefrom to a second position for ejecting said full bobbins therefrom, in that said pneumatic sensor means emits a stream of air into the path of said unloader means as it moves from said first to said second position thereof for generating a further pneumatic signal each time said air stream is interrupted by said unloader means movement, and in that said control means is operable to move said unloader means from said first position thereof to said second position thereof only after said second pneumatic signal has been received and is operable to move said transport means to said first position thereof only after said first pneumatic signal and said further pneumatic signal have been received.*

*13. Apparatus for doffing bobbins off the spindle of a spinning frame, said apparatus including:*

*(a) carriage means having movable transport means for advancing said carriage means along said spinning frame in sequential steps;*

*(b) bobbin doffing means carried by said carriage means and movable to doff full bobbins from said spinning frame spindles;*

*(c) pneumatic sensor means disposed to emit a stream of air into the path of movement of said transport means and into the path of movement of said bobbin doffing means, said sensor means generating a pneumatic signal each time said stream of air is interrupted by said movement of said transport means and by said movement of said bobbin doffing means; and*

*(d) control means receiving said pneumatic signals and operable to cause said movement of said transport means and said bobbin doffing means in a predetermined sequence.*

* * * * *